United States Patent [19]

Johansson et al.

[11] 4,090,620

[45] May 23, 1978

[54] METHOD OF TRANSHIPPING GENERAL CARGO BETWEEN WHEELED CARRIAGES AND SHIPS, AND A PLANT FOR WORKING THIS METHOD

[75] Inventors: Anders Johansson, Bohus Bjorko; Per Strombeck, Lindome, both of Sweden

[73] Assignee: Salen & Wicander Terminalsystem AB, Vastra Frolunda, Sweden

[21] Appl. No.: 772,243

[22] Filed: Feb. 25, 1977

[30] Foreign Application Priority Data

Feb. 27, 1976 Sweden .................................. 7602612

[51] Int. Cl.² ............................................. B65G 1/06
[52] U.S. Cl. .................................. 214/16 B; 104/1 R; 104/29; 104/48; 214/14; 214/152
[58] Field of Search ................... 214/14, 16 B, 38 CA, 214/38 CC, 38 D, 152; 104/1 R, 29, 31, 48, 88, 127–129

[56] References Cited

U.S. PATENT DOCUMENTS

| | | | |
|---|---|---|---|
| 3,091,188 | 5/1963 | Graham | 214/14 X |
| 3,631,993 | 1/1972 | Young | 214/14 X |

*Primary Examiner*—Robert G. Sheridan
*Attorney, Agent, or Firm*—Cantor and Singer

[57] ABSTRACT

General cargo must be stowed differently when being transported by ships, or by railway waggons and trucks, respectively. To reduce the time a ship is tied up in port, a transhipping station is provided, where work can proceed before the ship arrives and after the ship has left port. This station is arranged so it is available along one side to railway waggons carried by special transport devices, remotely from railway tracks, at a second side is available to cargo-bigflats, suited for cargo handling on board ships, and possibly also, along a third side, being available to road trucks.

4 Claims, 2 Drawing Figures

METHOD OF TRANSHIPPING GENERAL CARGO BETWEEN WHEELED CARRIAGES AND SHIPS, AND A PLANT FOR WORKING THIS METHOD

CROSS-REFERENCE TO RELATED APPLICATION

Reference is made to our related application Ser. No. 772,244, for "Device for Moving Railway Waggons", filed on even date herewith, and to U.S. Pat. No. 3,948,403, for "Device Adapted to Facilitate the Simultaneous Transportation of a Number of Standardized Load Units" in the same of Anders Johansson, one of the co-inventors of the present application.

BACKGROUND OF THE INVENTION

General cargo transported by means of wheeled carriages — railway waggons and road trucks — is not well suited for transportation in ships. A considerable amount of handling is required, which means that the ship will be tied up in port for a long time. The traditional manner in shifting cargo between railway waggons and a ship, and vice versa, is to have railway tracks running parallel with the quay, and then, step by step moving the waggons of a train past a ship moored at the quay. Different kinds of goods and different destinations will have to be considered when stowing the ship, and much shunting of waggons may have to be done in order to present the goods in proper order.

Ships are nowadays, to an increasing extent, fitted for the transportation of uniform cargo units, in the first hand shipping containers, and if the cargo, beforehand is stowed into such containers the loading and unloading of a ship may be arranged in a reduced time. Certain pieces of cargo are not suited for transportation in shipping containers, i.a due to the costs, and also the handling of individual containers will require some time.

SUMMARY OF THE INVENTION

A considerable simplification of the handling of general cargo would be obtained, if the pieces of cargo were sorted and located in big handling units, here called cargo-bigflats, each with a given content and intended for a predetermined destination.

These cargo-bigflats should be stowed and ready when the ship enters port, or may rapidly be unloaded from the ship, whereafter the cargo, when the ship has left port, in due order may be distributed to railway waggons or road trucks for further transportation. In order to make possible such handling the invention proposed the use of a plant including a number of parallel railway lines located at some distance from the quay and terminated by pockets arranged in a stepwise pattern, where the length of each pocket about corresponds to the length of a railway waggon, and a transhipping station located between said railway lines and the quay said station having a horizontal platform being so disposed with respect to the surrounding ground level, that the vertical distance between the platform and the ground level along at least one side of the station corresponds to the measure between said level and the floor of a railway waggon mounted upon a transport device, while the vertical distance between the ground level and the platform along at least one further side thereof corresponds to the height of a cargo-bigflat.

For moving waggons between the railway tracks and the transhipping station, and for moving the cargo-bigflats from the station to the quay a number of special transport devices will be needed.

The transhipping station is preferably arranged in such a manner that the distance between the platform and the ground level along at least one third side of the station corresponds to the measure between the ground level and the floor of a standard road truck.

DESCRIPTION OF A PREFERRED EMBODIMENT

Figure 1:
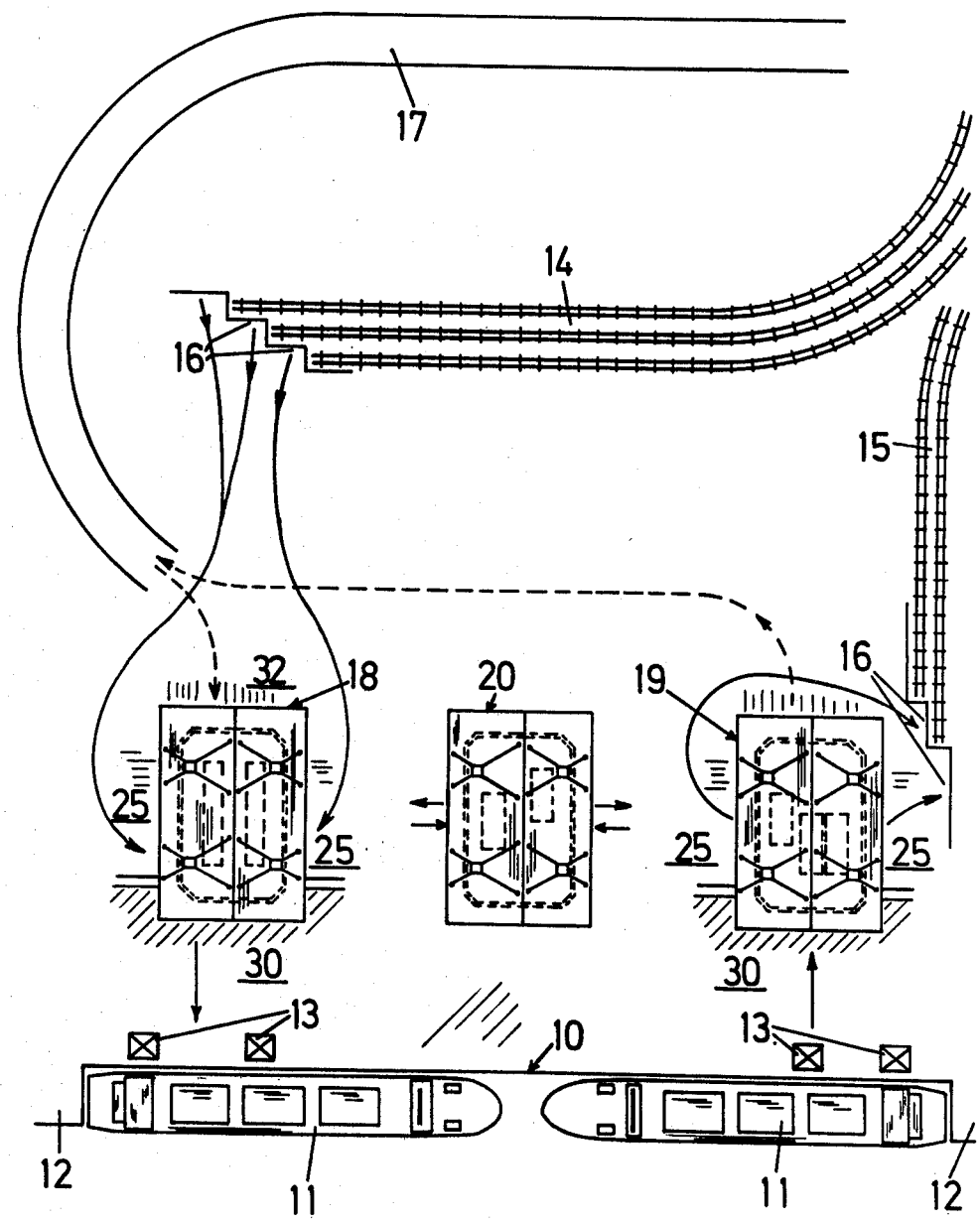
FIG. 1 very schematically shows a plan of the cargo handling area along a quay.

In FIG. 1 reference 10 denotes a quay, along which two ships 11 are moored. The quay is provided with ramps 12, permitting wheeled vehicles to drive directly into the ship by an opening in its deck (roll-on/roll-off), as well as with cranes 13 for ordinary cargo handling (lift-on/lift-off).

A number of railway tracks 14, 15 are extended in parallel relationship, here arranged in two, spaced-apart groups. Within each of these groups each track, for reasons which will be explained below, is terminated at a pocket 16 having a length about corresponding to that of a railway waggon, the pockets being arranged in a stepwise pattern.

Cargo may also be moved to and from the plant by means of a roadway 17.

For handling general cargo the plant shown includes two transhipping stations 18 and 19, one intended for outgoing cargo, and the other for incoming cargo. Apart from conditions imparted by the direction of flow of cargo, the stations are mutually alike, and will be described in connection with FIG. 2. Between the stations there is a buffer store 20.

A ship is expected to receive cargo of different kinds intended for different destinations, and in varying quantities for each port. The cargo may arrive at a port overland in different ways, and often a long time before the ship arrives.

In order to reduce the stop-over in port, it is essential that the cargo is sorted out according to its destination, and is stowed into units, which facilitate handling.

The reverse applies to the unloading of a ship, where the units received at some foreign ports will have to be dismantled, the goods sorted out according to their inland distination, and be formed into packages suited for transportation by rail or by road.

Figure 2:
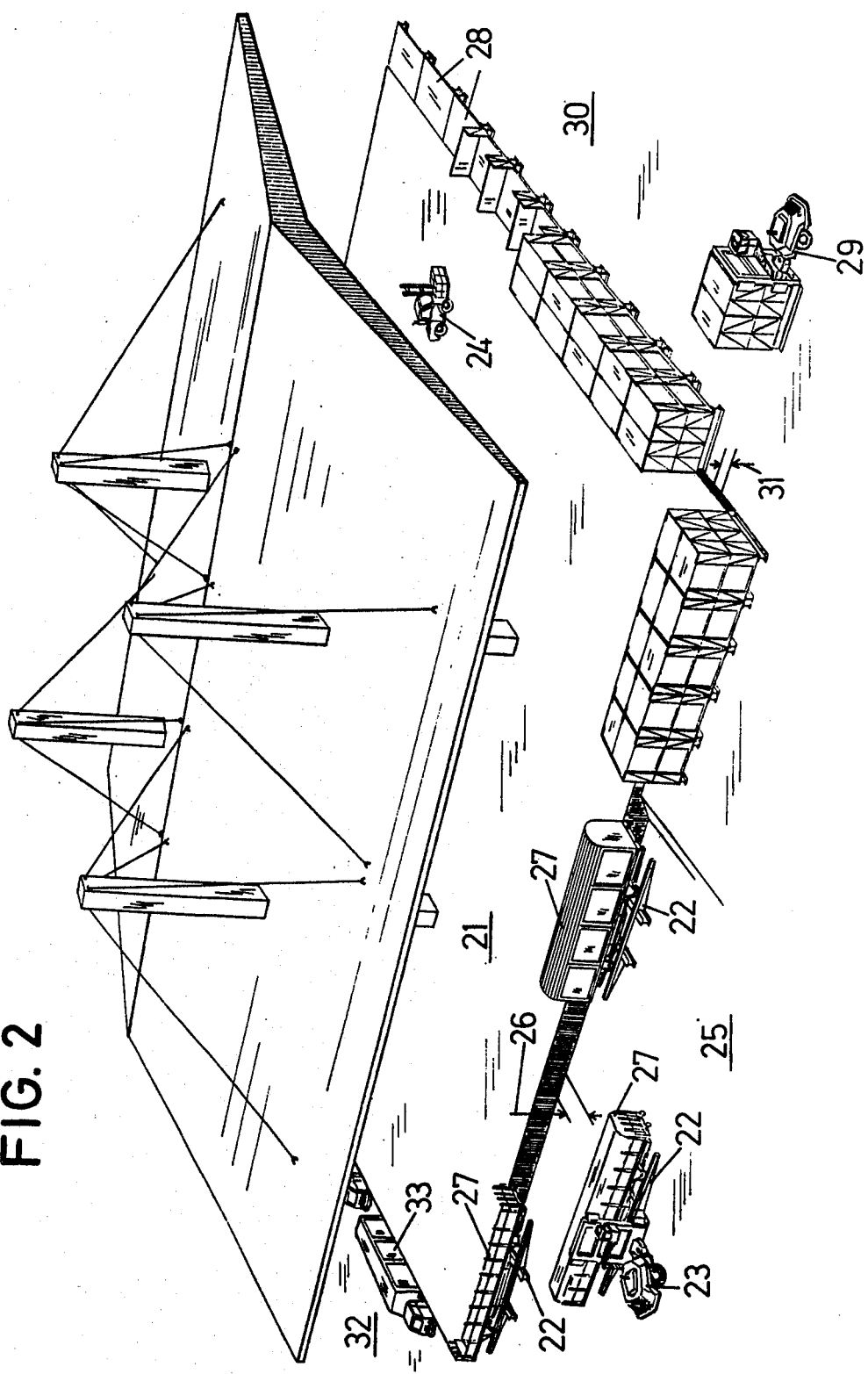
FIG. 2 shows a perspective view of a transhipping station.

A transhipping station 18, 19 is schematically shown in FIG. 2. A basic consideration is that there shall be provided a horizontal working platform 21, which is easily accessible by at least two different types of transport devices.

Such a station may, in different climatal areas, be more or less covered, or more or less walled in with screen walls or other protection. Within the station means (not shown) for temporary sorting, storing and packing of goods are provided. Such means are well known in the art, and are selected with respect to the kind of goods which is most common.

Goods arriving by rail are moved from the railway lines 14, 15 to the station by means of special rail carriers 22. These are built as a beam framework, and support two pieces of rail having a length corresponding to that of a railway waggon. These carriers are adapted to be located in the pockets 16 at the heads of railway lines 14 and 15.

As the railway tracks are terminated in the stepwise pattern shown, each track will be easily accessible, and it is possible by a simple shunting of the waggons to obtain a preliminary sorting-out of the goods. One track, for instance the most remotely located one, is preferably intended for the delivery, or the collection, respectively, of empty waggons.

The rail carriers are moved between the stations and the railway by means of special vehicles, of which one is shown at 23.

For making possible a rational handling of the cargo it is essential that trucks 24, or other wheeled accessories, which are used within the station, can be driven from the platform directly into the railway waggons. To that end the ground level 25, along at least one side of the station, is disposed in such a manner, that the distance 26 between the ground and the level of platform 21 corresponds to the measure between the floor of a railway waggon 27 mounted upon a rail carrier, and the base of the carrier. When a carrier with a railway waggon is located along this side of the platform, it will thus be possible to drive directly from the platform into the waggon and back again.

The arriving general cargo, which of course, to some extent, may be stowed on pallets, must now be sorted out, and formed into units suited for transport by ships.

Such units are made up on bigflats 28, which may be moved between the station and the quay, or possibly directly into the ship (roll-on/roll-off) by means of special transport devices 29. These cargo-bigflats are here intended to carry cargo having a volume corresponding to four standard shipping containers, or so called flats having a base area corresponding to that of a container, but being better suited than a container for handling general cargo.

An ordinary cargo flat is provided with a strong base, or floor, and two end walls, or possibly only four corner posts, and they are stowed side by side and on top of each other, same as, or together with containers.

It is also essential, that trucks 24 may drive directly from platform 21 out onto the cargo-bigflats. The ground level 30 along at least one side of the station is therefore disposed in such a manner that the distance 31 between ground level and platform 21 corresponds to the height of a cargo-bigflat.

Cargo may also, as mentioned above, be moved to and from the station by means of road trucks, and as the height of the platform of a truck, above ground, is less than distance 26, required by the rail carrier, the ground level 32 along a further side of the station is disposed in a manner suited for the reception of road trucks 33.

In the embodiment shown ground level 30 extends along the full side of the station turned towards the quay, as well as shorter portions of the adjoining sides. Ground level 25, suited for the rail carriers extends along the remainders of lastmentioned sides, the disposition being selected so as to permit the reception of three railway waggons. It is evident that the ground level, within the pockets at the railway tracks, must be suited to permit the rails on the carrier to be positioned level with the rails in tracks 14 and 15, respectively.

Depending upon the expected cargo flow by rail or by road, respectively, the fourth side of the station may be reserved exclusively for trucks or the ground level along the same may be disposed so it is possible to receive at least some railway waggon there.

The difference between level 25 and level 32 may of course temporarily be evened-out by means of special ramps, making it possible to receive road trucks along a side normally adapted for the reception of rail carriers. The fourth side may also be formed so the trucks may be driven, in reverse, into pockets therein.

The components of the plant above described must be regarded as schematic only, and are selected to illustrate the principles for this novel system of general cargo handling. Buffer store 20 is mostly intended for cargo which has not yet been stowed into shipping units, or which has arrived by ship, but has not been distributed. There should further be areas suited for the storing of loaded bigflats, waiting for a ship to arrive, workshops and so forth, but such and other facilities common to cargo handling, will have to be adapted according to local facilities and are not shown here. Evidently ordinary shipping containers can be loaded, or unloaded, directly along the side of the station adjoining ground level 30, if they are turned with their entrance end towards the station and are supported at a suitable height.

What I claim is:

1. A method of transhipping general cargo between wheeled carriages and ships including the step of
   (a) arranging a number of railway tracks in parallel relationship at a distance from a quay and terminating each railway track at a pocket forming part of a stepwise pattern, where each pocket has a length about corresponding to a railway waggon whereby railway waggons are transported to and from said tracks by transport devices,
   (b) providing at least one transhipping station between said railway tracks and the quay and spaced apart therefrom, said station being defined by at least three sides, and having a horizontal platform,
   (c) forming the ground level surrounding said station so said platform, along at least one of said sides will be located at a vertical distance above the adjacent ground level corresponding to the measure between said level and the floor of a railway waggon mounted upon a transport device, and further, along at least a second of said sides forming the ground level so the vertical distance between the platform and the ground corresponds to the height of a cargo-bigflat,
   (d) moving railway waggons by means of said transport devices between the railway tracks and the transhipping station and by other transport means moving the cargo-bigflats between the station and a ship at the quay, and
   (e) re-dispositioning, within the transhipping station, the general cargo to and from units suitable and destined for wheeled traffic from and to units suitable and destined for handling by cargo-bigflats.

2. The method according to claim 1 further including forming the ground level along at least a third of said sides so the vertical distance between the platform and the ground level corresponds to the measure between said ground level and the floor of a standard road truck.

3. A plant for transhipping general cargo between wheeled carriages and ships along a quay including
   a number of parallel railway tracks located at some distance from the quay and terminated by pockets arranged in a stepwise pattern, where the length of each pocket about corresponds to the length of a railway waggon whereby railway waggons are transported to and from said tracks by transport devices, and at least one transhipping station located between said railway lines and the quay and spaced apart therefrom, said station being defined by at least three sides and having a horizontal platform with the surrounding ground level so disposed with respect to the horizontal platform, that the vertical distance between the platform and the ground level along at least one of said sides corresponds to the measure between said level and the floor of a railway waggon mounted upon a transport device, while the vertical distance between the ground level and the platform along at least a second of said sides thereof corresponds to the height of a cargo-bigflats.

4. The plant according to claim 3, in which the ground level is disposed in such a manner that the distance between the platform and the ground level along at least a third of said sides corresponds to the measure between the ground level and the floor of a standard road truck.

* * * * *